United States Patent [19]

Schulman

[11] 3,717,571
[45] Feb. 20, 1973

[54] HYDROGEN PURIFICATION AND RECYCLE IN HYDROGENATING HEAVY MINERAL OILS

[75] Inventor: Bernard L. Schulman, Livingston, N.J.

[73] Assignee: Esso Research and Engineering Company

[22] Filed: Nov. 3, 1970

[21] Appl. No.: 86,494

[52] U.S. Cl. ..........................208/254 H, 208/210
[51] Int. Cl. .................................C10g 23/00
[58] Field of Search ............208/254 H, 210, 89

[56] References Cited

UNITED STATES PATENTS

| 3,328,288 | 6/1967 | Streed | 208/254 H |
| 3,268,438 | 8/1966 | Scott, Jr. et al. | 208/89 |
| 3,519,557 | 7/1970 | Pruiss | 208/210 |
| 3,147,210 | 9/1964 | Hass et al. | 208/210 |
| 2,728,710 | 12/1955 | Hendricks | 208/254 H |

Primary Examiner—Delbert E. Gantz
Assistant Examiner—G. J. Crasanakis
Attorney—Thomas B. McCulloch, Melvin F. Fincke, John S. Schneider and Sylvester W. Brock, Jr.

[57] ABSTRACT

Heavy mineral oils with high nitrogen contents are hydrogenated in two stages, with gas effluent from only the first stage being scrubbed to remove ammonia and then sent to the second stage with hydrogen makeup, the gas effluent from the second stage being recycled without scrubbing as the hydrogen feed for the first stage, the first stage effluent undergoes separation in two high pressure zones to produce light liquid hydrocarbons as a product of the process.

7 Claims, 1 Drawing Figure

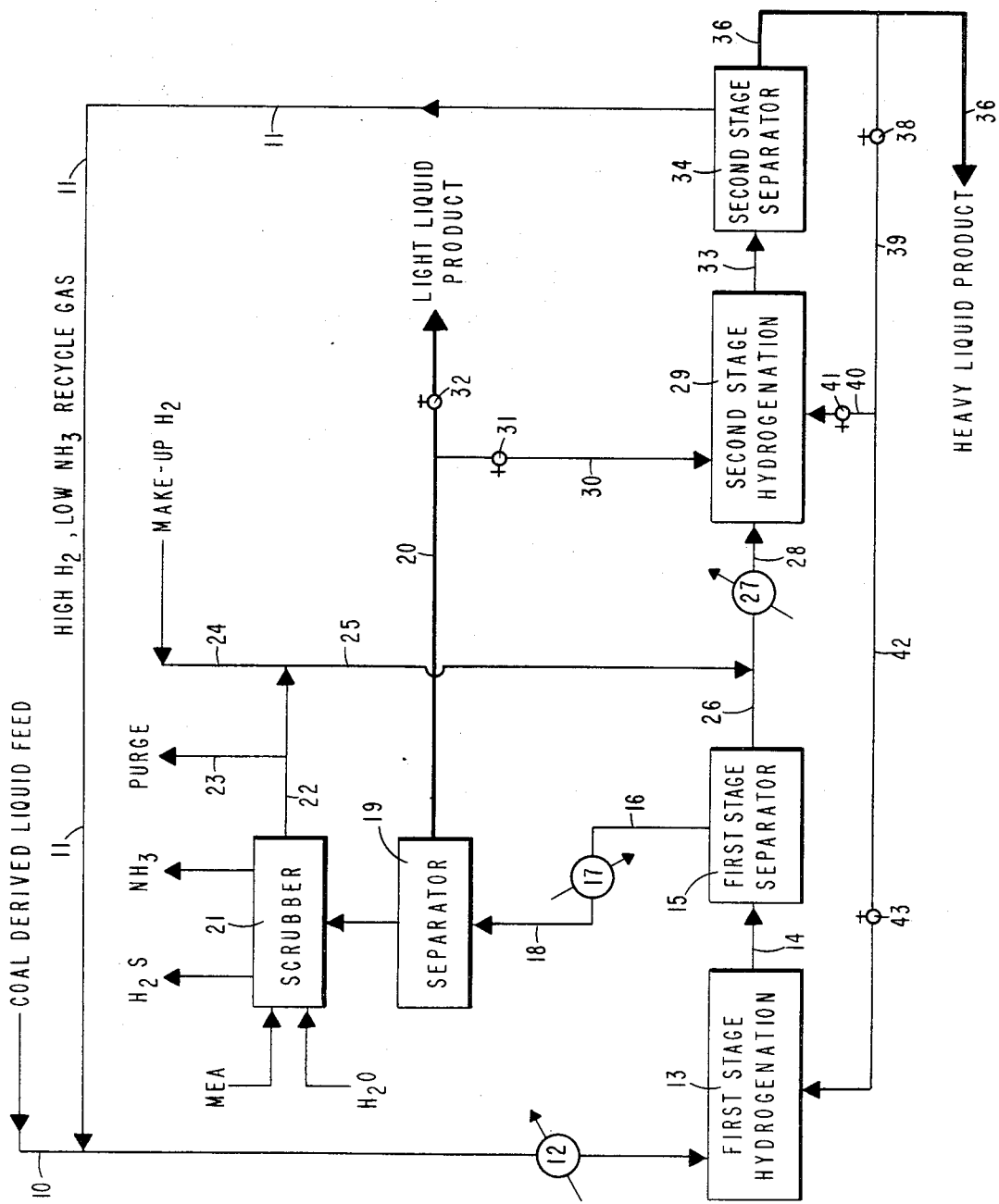

HYDROGEN PURIFICATION AND RECYCLE IN HYDROGENATING HEAVY MINERAL OILS

BACKGROUND OF THE INVENTION

1. Field of the Invention

This invention relates to catalytic hydrotreatment of heavy mineral feedstocks containing high nitrogen contents to produce refined heavy oils boiling in the gas oil range. More specifically, the invention involves the hydrogenation and denitrogenation of mineral oil feedstocks boiling above about 400° F. in a two-stage hydrogenation reaction system in which fresh hydrogen is introduced into the system only at the inlet to the second hydrogenating stage, and the hydrogen-containing gaseous effluent of the second stage is recycled for subsequent use in the first hydrogenating stage.

2. Description of the Prior Art

In hydrotreating such liquids as coal liquids, raw shale oil, or other heavy mineral oils with high nitrogen contents (i.e., greater than about 0.1 weight percent organic nitrogen), the hydrogenation and denitrogenation reactions have been severely inhibited by the ammonia produced. Interstage scrubbing of the gas produced in the hydrotreatment has often been suggested and used as a method to remove the ammonia and to improve reaction kinetics. This type of interstage scrubbing requires multiple scrubbing units, which add greatly to the expense of the overall operation. By employing the present invention, high hydrogenation and denitrogenation rates may be obtained without the cost burden of multiple scrubbing units.

Prior art considered in the preparation of this application include U.S. Pat. Nos. 3,025,231; 3,180,820; 3,132,089; 3,256,178; and 3,364,133.

SUMMARY OF THE INVENTION

By the present invention, heavy mineral oil feedstocks with high nitrogen contents are hydrotreated and denitrogenated in two reaction stages, with the gas effluent from only the first stage being scrubbed to remove ammonia. Scrubbing the ammonia from the gaseous effluent of the first hydrogenation stage reduces the ammonia partial pressures that would otherwise exist in the second stage of the reactor system. The scrubbed gas is fed to the second stage of the reactor system along with added fresh hydrogen gas. In the low ammonia environment and increased hydrogen partial pressure of the second stage reactor, high hydrogenation and denitrogen rates are achieved. The gaseous effluent from the second stage contains hydrogen in such sufficient quantities that it is recycled to serve as the hydrogen feed source for the first hydrogenation stage.

More particularly, heavy mineral oil feedstocks containing at least 0.1 weight percent of organic nitrogen are hydrotreated and denitrogenated first in a first stage hydrogenation zone in the presence of a hydrogenation catalyst under hydrogenation conditions correlated to produce from about 40 to about 75 percent hydrodenitrogenation of the feedstock. The effluent from the first hydrogenation zone is then treated to separate effluent gases from the zone (including ammonia and hydrogen gases) from partially denitrogenated heavy liquid effluent. Ammonia is scrubbed from the effluent gases from the first hydrogenation zone to recover a first hydrogen stream substantially free of ammonia, and fresh hydrogen is added to that stream to form a second hydrogen stream having a predetermined hydrogen content. The second hydrogen stream is contacted in a second hydrogenation zone with the heavy liquid effluent from the first hydrogenation zone in the presence of a hydrogenation catalyst under hydrogenation conditions correlated to produce a heavy liquid product effluent therefrom having no more than about 1,000 p.p.m. of organic nitrogen. The effluent from the second hydrogenation zone is then treated to separate effluent gases (including hydrogen and ammonia) from the effluent heavy liquid product, and the effluent gases so separated are then recycled to the first hydrogenation zone to serve as hydrogen feed to that zone.

The generic term hydrogenation is used in this application to describe hydrogenating treatments in which hydrogen uptake does not exceed about 4,000 SCF/B. The catalysts employed in the hydrogenation reactors are conventional hydrofining-hydrogenation catalysts. Such catalysts include salts of metals of Group VI and VIII of the Periodic Table supported on a suitable porous support material such as alumina, silica alumina, bauxite, magnesia and the like. Catalysts containing oxides or sulfides of cobalt, nickel, molybdenum, and tungsten are preferred. Oxide catalysts are preferably sulfided prior to use or in situ. Preferred catalysts are mixtures of cobalt and molybdenum oxides or sulfides on alumina support, most preferably one containing 2-5 weight percent cobalt oxide, 10-25 weight percent molybdenum oxide and the balance silica stabilized alumina. The preferred silica content of the base is 1.5 to 5 weight percent.

The feedstocks treated according to this invention include, in general, any mineral oil feedstock boiling above about 400° F., up to about 1,000° F., and having an API gravity of from about −20° to about +40°. These characteristics denote the feedstock as "heavy." Such heavy mineral oil feedstocks may suitably be derived from petroleum crude oils, shale oils, tar sand oils, coal hydrogenation products, and the like. The advantage of the process is its effectiveness in processing heavy feedstocks having high nitrogen content, from about 0.1 to about 3.0 weight percent nitrogen, especially raw shale oil, which typically contains over 2 weight percent of organic nitrogen, and liquid products obtained from coal which generally contain from about 0.1 to about 0.9 weight percent of organic nitrogen.

Liquid feedstocks derived from coal and oil bearing shale are preferred feedstocks for the process, because they contain only a small portion, generally about 5 weight percent, of light liquid hydrocarbons, which boil within the range from about 300° F. to about 400° F. These light liquids, which exist in the vapor phase in the first stage reactor under the reactor process conditions employed, preferably are liquefied from the gaseous effluent of the first stage reactor, and the liquids then are either withdrawn from the system as light liquid product or charged to the second stage reactor for further denitrogenation. Light liquids are suitably charged to the second stage reactor if their nitrogen content does not exceed about 0.25 weight percent, preferably not above about 0.1 weight percent. Among the benefits of using heavy feedstocks which contain only the small portion of light liquids is the reduced sizing of equipment necessary to handle such light liquids and the minimizing of heat duty in condensing to liquid state the vapor phase light liquids in the gaseous effluent of the first stage reactor.

The treatment of the effluent from the first stage reactor to separate effluent gas and partially denitrogenated heavy liquid effluent suitably may be accomplished in several ways. In one, the light liquid hydrocarbons of the feedstock is retained with the heavy liquid effluent. For example, the effluent from the first stage reactor is cooled sufficiently to liquify vaporized light liquid hydrocarbons but not hydrogen and ammonia gases, and the gas and liquid phases are then disengaged in a separator. The light liquid product is then distilled or stripped from the heavy liquid effluent from the first stage reactor, condensed, and recovered as product, which may be charged to the second stage reactor if desired. Preferably, however, the treatment separates all the gaseous effluent, including vaporized light liquids hydrocarbons from the heavy liquid effluent, subsequently condensing the light liquid hydrocarbons from the other gases and separating the liquids therefrom as a light liquid product which may be charged to the second stage reactor, if desired.

A more complete understanding of the invention is provided through a detailed description of a preferred mode of carrying it out, as illustrated in the accompanying drawing.

DESCRIPTION OF THE DRAWING

The drawing is a schematic flow diagram illustrating a preferred embodiment of the invention.

DESCRIPTION OF THE PREFERRED EMBODIMENT

Referring to the drawing, a liquefied coal product boiling over the range from about 400° F. to about 700° F. and containing about 0.4 weight percent of nitrogen is introduced as feedstock through line 10, where it is mixed with recycle hydrogen from line 11, preheated to incipient hydrogenation temperatures in preheater 12, and charged into a first stage hydrogenating zone 13 containing a suitable hydrogenation catalyst. In the first stage hydrogenation zone 13, the feedstock is subjected to hydrogenation conditions as follows:

FIRST STAGE HYDROGENATION CONDITIONS

|  | GENERAL | PREFERRED |
|---|---|---|
| Temp., °F. | 650 to 800 | 700 to 750 |
| Pressure, psig | 1000 to 4000 | 1500 to 2500 |
| LHSV, w/hr/w | 0.1 to 3.0 | 0.4 to 1.0 |
| $H_2$ treat rate, SCF/B | 5000 to 30,000 | 10,000 to 20,000 |

The hydrogenation conditions in the first reaction zone are correlated so as to convert from about 40 to about 75 weight percent of the organic nitrogen to ammonia, and to reduce the organic nitrogen content accordingly. Hydrogen uptake in the first reactor zone is from about 1,500 to about 2,500 SCF/B.

The total effluent from the first hydrogenation zone 13 is withdrawn by line 14 and charged into a hot high pressure gas/liquid separator 15, which disengages the gaseous effluent from the liquid effluent of the first stage hydrogenation zone. The gaseous effluent, which includes light liquid fractions in the vapor phase, $C_1$ – $C_3$ hydrocarbons, hydrogen, ammonia and hydrogen sulfide, is exhausted from separator 15 by way of line 16, which conducts it through a suitable heat exchanger 17, where the vapor state light liquid fractions are condensed to liquid state. The gas liquid stream from heat exchanger 17 is then introduced into a high pressure gas liquid separator which disengages the $C_1$ – $C_3$ hydrocarbons, hydrogen, ammonia and hydrogen sulfide gaseous constituents from the liquid phase light liquid fraction. The liquid phase light liquid fraction is discharged from separator 19 by line 20 and used as product or subjected to further hydrotreating, as hereinafter described.

The gases from separator 19 are passed into a countercurrent scrubber 21, where they pass upwardly through contacting devices in intimate contact with downwardly flowing water and thence monoethanol amine (MEA), in accordance with standard scrubbing practice, for absorption removal of ammonia and hydrogen sulfide from the gaseous stream. The liquid streams containing ammonia and hydrogen sulfide are removed from the scrubber 21 for conventional treatment. The scrubbed gas, substantially free of ammonia, containing from about 0.001 to about 0.01 volume percent of ammonia, is discharged from scrubber 21 by way of line 22 and purged through line 23. The purged gas in line 24 is combined with fresh hydrogen makeup to provide a predetermined hydrogen concentration in line 24, suitably from about 75 to about 99 volume percent, and the hydrogen stream is injected through line 25 into line 26. In line 26, the hydrogen stream mixes with the hot heavy liquid from first stage separator 17, and the combined streams are then heated, as needed, to incipient hydrogenating temperatures in preheater 27. From preheater 27, the heated stream passes through line 28 into a second stage hydrogenation zone 29. The light liquid product recovered from separator 19 by line 20 may be introduced, as by line 30 (valve 32 closed, valve 31 open) into the second stage hydrogenation zone 29 not only for further hydrotreating but also, if desired, without preheating to serve as heat quench to control temperature rise caused by the exothermic hydrogenation reaction, so long as the nitrogen content of the light liquid product doesn't exceed about 0.25 weight percent, preferably below 0.1 weight percent, e.g., 0.05 weight percent. In second stage hydrogenation zone 29 the total hydrocarbonaceous liquids are contacted with hydrogen in the presence of a hydrogenating catalyst, suitable hydrogenating conditions including:

SECOND STAGE HYDROGENATION CONDITIONS

|  | General | Preferred |
|---|---|---|
| Temp., °F. | 600 to 750 | 625 to 675 |
| Pressure, psig | 1000 to 4000 | 1500 to 2500 |

| | | |
|---|---|---|
| LHSV, w/hr/w | 0.1 to 3.0 | 1.0 to 2.0 |
| H₂ treat rate, SCF/B | 5000 to 30,000 | 10,000 to 20,000 |

The conditions in the second hydrogenating zone are adjusted to reduce the organic nitrogen content in the liquid hydrocarbons in the feed to less than 1,000 p.p.m. of nitrogen, suitably less than 200 p.p.m. of nitrogen, and preferably, to less than 50 p.p.m. of nitrogen. Hydrogen uptake in the second hydrogenating zone 29 is from about 500 to about 1,500 SCF/B.

The effluent from second hydrogenating zone 29 is withdrawn by way of line 33, and carried into second stage hot high pressure gas/liquid separator 34, where the hydrogenated and denitrogenated heavy liquid hydrocarbons are separated from effluent gases which include unconsumed hydrogen, $C_1 - C_3$ gases and ammonia generated in second hydrogenating zone 29. A typical second stage effluent gas stream will contain about 70–90 volume percent $H_2$ and about 0.05–0.3, perferably about 0.1 or less, volume percent $NH_3$. The gases are exhausted from gas/liquid separator 34 by way of line 35 to line 11 and recycled as hydrogen feed to line 10, as hereinbefore described. The heavy liquid product recovered from second stage separator 34 is withdrawn by way of line 36, and, if desired, a portion of it is recycled through line 37 (valve 38 open) and conducted through line 39 to branch lines 40 (valve 41 open) and 42 (valve 43 open) to quench the exothermic reactions in second hydrogenating zone 28 and first hydrogenating zone 13, respectively, and for further denitrogenation.

The following example will illustrate the results which can be obtained by using the invention, but should not be taken as a limitation to the scope of the invention.

EXAMPLE

Raw shale oil having the following properties:

| | |
|---|---|
| $N_2$ | 2.2° |
| °API | 20 |
| Boiling range | 350/1100° F. | is fed to the first stage hydrogenation unit under the following conditions:

| | |
|---|---|
| Total pressure | 1800 psia |
| H₂ partial pressure | 1450 psia |
| Avg. temp. | 725° F. |
| W/H/W | 0.8 |
| H₂ treat rate | 5000 SCF/B |
| Catalyst | CoMo on $Al_2O_3$ | to produce a liquid product containing about 0.5 weight percent $N_2$. The hydrogen uptake is about 1,000 SCF/B.

The effluent gas is scrubbed with water and monoethanolamine to obtain a scrubbed gas containing 65–85 volume percent $H_2$ and 0.001–0.01 volume percent $NH_3$.

The liquid product, scrubbed gases and makeup $H_2$ are fed to the second stage hydrogenation unit, operated at the following conditions:

| | |
|---|---|
| Total pressure | 1800 psia |
| H₂ partial pressure | 1450 psia |
| $NH_3$, Vol. ° | 0.0008–00.008 |
| Avg. temp. | 675° F. |
| W/H/W | 0.8 |
| H₂ treat rate | 5000 SCF/B |
| Catalyst | CoMo on $Al_2O_3$ | to produce a product having about 0.05 percent $N_2$, which makes an excellent "synthetic crude" for refining to fuel products. Hydrogen uptake is about 500 SCF/B. Overall the aromatics content of the oil is reduced from about 40 percent to about 10 percent.

The foregoing description of a preferred mode of performing the invention will suggest various changes and modifications of the process obvious to those skilled in the art which are nevertheless within the spirit and scope of my invention as defined by the following claims:

I claim:

1. A process for hydrogenating a heavy mineral oil feedstock containing from about 0.1 to about 3.0 weight percent of organic nitrogen, which comprises:
   a. contacting said heavy feedstock in a first hydrogenation zone with a hydrogenation catalyst and with a first hydrogen stream recycled from said (i) at sufficient elevated temperatures and pressures under hydrogenation conditions correlated to produce from about 40 to 75 percent hydrodenitrogenation of said feedstock;
   b. separating the first hydrogenation zone effluent in a first high pressure separation zone into a first denitrogenated liquid and a first gaseous effluent comprising (1) ammonia, (2) hydrogen and (3) light liquid hydrocarbons in the vapor phase;
   c. subjecting said first gaseous effluent to a heat transfer zone to produce a second gaseous effluent comprising ammonia and hydrogen, and said light liquid hydrocarbons in a liquefied phase;
   d. separating said second gaseous effluent from said liquefied phase in a second high pressure separation zone and withdrawing said liquefied phase as a product of said process;
   e. separating ammonia from said second gaseous effluent to produce a second hydrogen stream which is substantially free of ammonia;
   f. adding fresh hydrogen to said second hydrogen stream to produce a third hydrogen stream having a predetermined hydrogen content;
   g. contacting said third hydrogen stream with said first denitrogenated liquid in a second hydrogenation zone with a hydrogenation catalyst at sufficient elevated temperatures and pressures and hydrogenation conditions correlated to produce a second hydrogenation zone effluent which contains less than about 1,000 ppm organic nitrogen;
   h. separating said second hydrogenation zone effluent in a third high pressure separation zone into a second denitrogenated liquid and a third gaseous effluent; and
   i. recycling said third gaseous effluent to said first hydrogenation zone as said first hydrogen stream therein.

2. The process of claim 1 wherein said third gaseous effluent from said third high pressure separation zone contains no more than about 0.3 volume percent ammonia and said second hydrogen stream contains no more than about 0.01 volume percent of ammonia.

3. The process of claim 1 wherein said third gaseous effluent from said third high pressure separation zone contains from about 70 to about 90 volume percent hydrogen.

4. The process of claim 1 wherein the hydrogenation conditions in said first hydrogenation zone comprise:

a temperature within the range from about 650° F. to about 800° F., a pressure within the range from about 1000 psig to about 4,000 psig, a LHSV within the range from about 0.1 w/hr/w to about 3.0 w/hr/w, and a hydrogen-treat rate within the range from about 5,000 SCF/B to about 30,000 SCF/B, and wherein the hydrogenation conditions in said second hydrogenation zone comprise:

a temperature within the range from about about 600° F. to about 750° F., a pressure within the range from about 1,000 psig to about 4,000 psig, a LHSV within the range from about 0.1 w/hr/w to about 3.0 w/hr/w, and a hydrogen-treat rate within the range from about 5,000 SCF/B to about 30,000 SCF/B, and wherein the hydrogenation catalyst in said first and second hydrogenation zones comprises a compound of a Group VI-B metal and a compound of a Group VIII metal of the Periodic Table supported on a porous support.

5. The process of claim 2 wherein said hydrogenation catalyst is selected from a mixture of oxides of cobalt and molybdenum on alumina support and a mixture of oxides and sulfides of cobalt and molybdenum on alumina support.

6. The process as set forth in claim 4 wherein (1) in step (e) the ammonia is separated from said second gaseous effluent by scrubbing and the second hydrogen stream resulting therefrom contains less than about 0.01 volume percent of ammonia, and (2) said third hydrogen stream contains from about 75 to about 99 volume percent hydrogen.

7. The process as set forth in claim 1 wherein the hydrogenation catalyst is selected from a mixture of oxides of cobalt and molybdenum on alumina support and a mixture of oxides and sulfides of cobalt and molybdenum on alumina support.

* * * * *